(12) United States Patent
Leishman et al.

(10) Patent No.: US 12,645,565 B2
(45) Date of Patent: Jun. 2, 2026

(54) INTELLIGENT SYSTEMS AND METHODS FOR MONITORING A MACHINE LEARNING MODEL

(71) Applicant: Allstate Insurance Company, Northbrook, IL (US)

(72) Inventors: Laura Leishman, Northbrook, IL (US); Sarah Marquesen, Northbrook, IL (US); Andrey Dovzhenok, Northbrook, IL (US); Vivian Lin, Northbrook, IL (US); Mihaela Marcusanu, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/663,249

(22) Filed: May 14, 2024

(65) Prior Publication Data

US 2025/0355785 A1 Nov. 20, 2025

(51) Int. Cl.
*G06F 11/36* (2025.01)
*G06F 11/3604* (2025.01)
*G06F 11/3668* (2025.01)
*G06F 11/3698* (2025.01)

(52) U.S. Cl.
CPC ...... *G06F 11/3616* (2013.01); *G06F 11/3688* (2013.01); *G06F 11/3698* (2025.01)

(58) Field of Classification Search
CPC .. G06F 11/36; G06F 11/3616; G06F 11/3698; G06F 11/3688
See application file for complete search history.

(56) References Cited

U.S. PATENT DOCUMENTS

| | | | | |
|---|---|---|---|---|
| 2019/0156247 A1* | 5/2019 | Faulhaber, Jr. | ........ | G06N 3/045 |
| 2020/0097797 A1* | 3/2020 | Aragon | .................... | G06N 3/08 |
| 2020/0167639 A1* | 5/2020 | Xue | ...................... | G06F 18/217 |
| 2020/0387836 A1* | 12/2020 | Nasr-Azadani | ........ | G06N 20/20 |
| 2021/0097439 A1* | 4/2021 | Vodencarevic | ....... | G06F 18/214 |
| 2021/0174258 A1* | 6/2021 | Wenchel | ................ | G06N 20/00 |
| 2021/0241182 A1* | 8/2021 | Shrivastava | ........... | G06N 20/20 |
| 2022/0414262 A1* | 12/2022 | Degioanni | ............... | G06N 5/02 |

(Continued)

FOREIGN PATENT DOCUMENTS

| | | |
|---|---|---|
| CN | 110705719 A | 1/2020 |
| WO | 2021067385 A1 | 4/2021 |

(Continued)

*Primary Examiner* — Kamini B Patel
(74) *Attorney, Agent, or Firm* — Dinsmore & Shohl LLP

(57) ABSTRACT

Systems and methods for intelligent machine learning model monitoring may include executing statistical test(s) for metric(s) to determine whether at least one of data used or an output in each machine learning model is statistically similar to expectations based on at least one of training data or test data for each model; when a first test failure of a tested model of a plurality of machine learning models occurs based on the statistical test(s) for the metric(s) exceeding a first test threshold, automatically executing an additional test based on the first test failure and additional historical data; and automatically generating an alert of test failure for the tested model based on the additional test exceeding an additional test threshold as a second test failure. The second test failure is representative of verification of the first test failure.

20 Claims, 7 Drawing Sheets

(56)                References Cited

U.S. PATENT DOCUMENTS

| | | | |
|---|---|---|---|
| 2023/0111047 A1* | 4/2023 | Brin | G06F 18/40 |
| | | | 706/12 |
| 2024/0273412 A1* | 8/2024 | Brockett | G06N 20/00 |
| 2024/0281722 A1* | 8/2024 | Tirupathi | G06N 20/20 |
| 2025/0139706 A1* | 5/2025 | Mckay | G06N 20/00 |
| 2025/0173555 A1* | 5/2025 | Luus | G06N 3/0475 |

FOREIGN PATENT DOCUMENTS

| | | |
|---|---|---|
| WO | 2021079485 A1 | 4/2021 |
| WO | 2021108680 A1 | 6/2021 |

* cited by examiner

Figure 6:
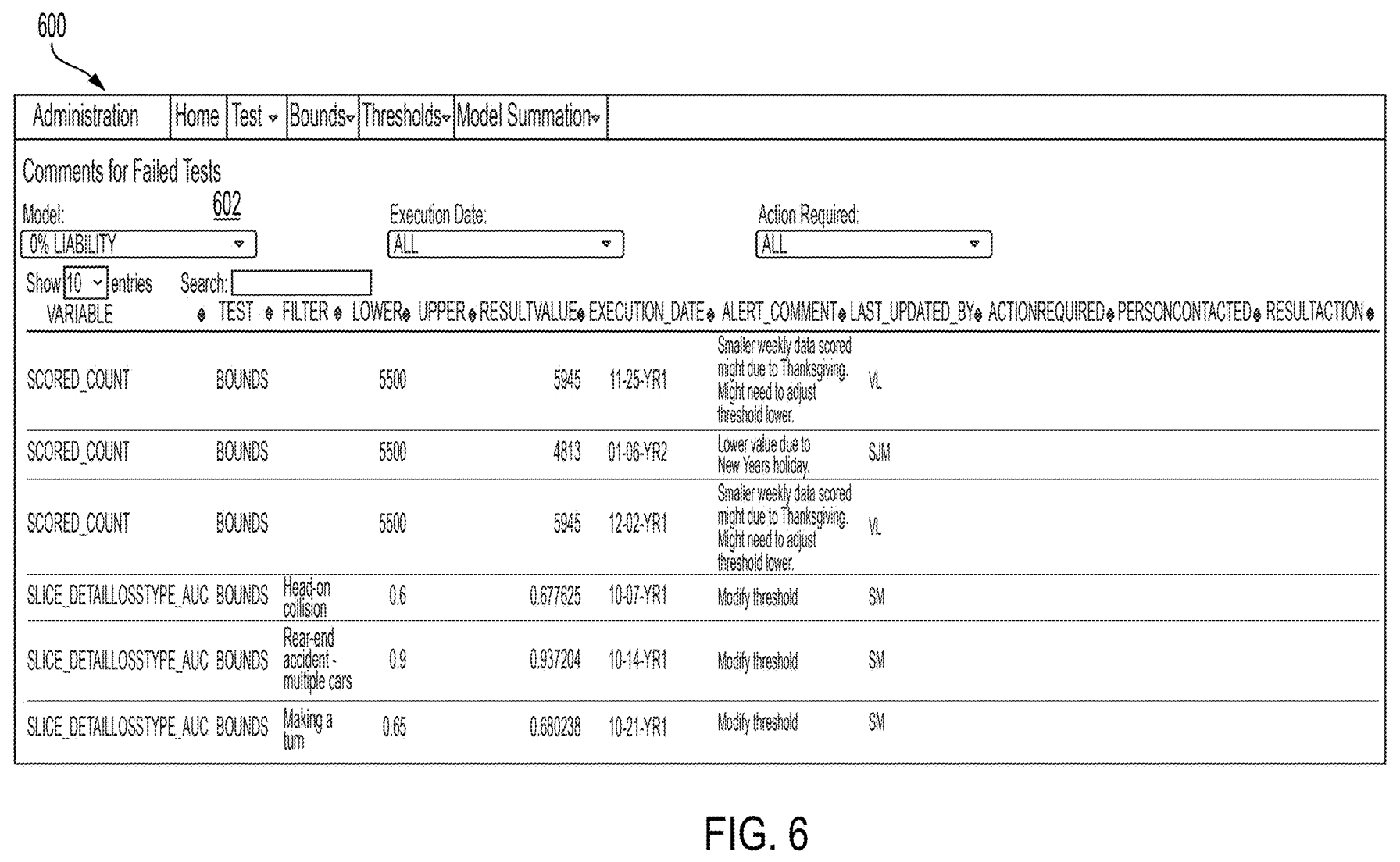

Administration | Home | Test ▾ | Bounds▾ | Thresholds▾ | Model Summation▾

Comments for Failed Tests

Model: 602    0% LIABILITY ▾

Execution Date: ALL ▾

Action Required: ALL ▾

Show [10 ▾] entries    Search: [ ]

| VARIABLE ◆ | TEST ◆ | FILTER ◆ | LOWER◆ | UPPER◆ | RESULTVALUE◆ | EXECUTION_DATE◆ | ALERT_COMMENT◆ | LAST_UPDATED_BY◆ | ACTIONREQUIRED◆ | PERSONCONTACTED◆ | RESULTACTION◆ |
|---|---|---|---|---|---|---|---|---|---|---|---|
| SCORED_COUNT | BOUNDS | | 5500 | 5945 | | 11-26-YR1 | Smaller weekly data scored might due to thanksgiving. Might need to adjust threshold lower. | VL | | | |
| SCORED_COUNT | BOUNDS | | 5500 | 4813 | | 01-06-YR2 | Lower value due to New Years holiday. | SJM | | | |
| SCORED_COUNT | BOUNDS | | 5500 | 5945 | | 12-02-YR1 | Smaller weekly data scored might due to thanksgiving. Might need to adjust threshold lower. | VL | | | |
| SLICE_DETAILLOSSTYPE_AUC | BOUNDS | Head-on collision | 0.6 | | 0.677625 | 10-07-YR1 | Modify threshold | SM | | | |
| SLICE_DETAILLOSSTYPE_AUC | BOUNDS | Rear-end accident - multiple cars | 0.9 | | 0.937204 | 10-14-YR1 | Modify threshold | SM | | | |
| SLICE_DETAILLOSSTYPE_AUC | BOUNDS | Making a turn | 0.65 | | 0.680238 | 10-21-YR1 | Modify threshold | SM | | | |

| VARIABLENAME | TESTTYPENAME | TYPE_VALUE | UPPERBOUND | RESULTVALUE | RUNDATE | DATADATE | VARIABLEID | Supplemental |
|---|---|---|---|---|---|---|---|---|
| 1 ACTION_DESC | BOUNDS | G29 | 0.10 | 0.23 | YR2-08-02 | 21-30 | 8.00 | |

INTELLIGENT SYSTEMS AND METHODS FOR MONITORING A MACHINE LEARNING MODEL

TECHNICAL FIELD

The present disclosure relates to systems and methods for one or more monitoring machine learning models and, in particular, artificial intelligence (AI) based systems and methods for monitoring one or more machine learning models and enacting a dual verification of test results after a first test failure result for a metric of a monitored model.

BACKGROUND

A machine learning model when in production, also referenced as a production model, is frozen in time based on training data used during the production stage. Afterwards, the machine learning model based on the production model can learn from new, real-time data to become a new, in-use model. However, such new data may diverge from the training data over time such that the production model becomes inaccurate as a base and the new, in-use model may need to be re-trained. Accordingly, a need exists for efficient method of monitoring a new model to determine whether accuracy of the new model and the production model is appropriate over time.

BRIEF SUMMARY

According to the subject matter of the present disclosure, a system for intelligent machine learning model monitoring may include one or more processors, one or more memory components communicatively coupled to the one or more processors, and machine readable instructions stored in the one or more memory components that cause the system to perform at least the following when executed by the one or more processors: execute one or more statistical tests for one or more metrics to determine whether at least one of data used or an output in each machine learning model of a plurality of machine learning models is statistically similar to expectations based on at least one of training data or test data for each model. The machine readable instructions may further cause the system to: when a first test failure of a tested model of the plurality of machine learning models occurs based on the one or more statistical tests for the one or more metrics exceeding a first test threshold, automatically execute an additional test based on the first test failure and additional historical data; and automatically generate an alert of test failure for the tested model based on the additional test exceeding an additional test threshold as a second test failure. The second test failure is representative of verification of the first test failure.

According to another embodiment of the present disclosure, a system for intelligent machine learning model monitoring may include one or more processors, one or more memory components communicatively coupled to the one or more processors, and machine readable instructions stored in the one or more memory components. The machine readable instructions may cause the system to perform at least the following when executed by the one or more processors: execute one or more statistical tests for one or more first metrics to determine whether data used in each machine learning model of a plurality of machine learning models is statistically similar to expectations based on training data for each model; and execute one or more statistical tests for one or more second metrics to determine whether an output of each machine learning model of the plurality of machine learning models is statistically similar to expectations based on test data for each model. When a first test failure of a tested model of the plurality of machine learning models occurs based on the one or more statistical tests for the one or more first metrics or the one or more statistical tests for the one or more second metrics exceeding a first test threshold, the machine readable instructions may further cause the system to automatically execute an additional test based on the first test failure and additional historical data. The machine readable instructions may further cause the system to: automatically generate an alert of test failure for the tested model based on the additional test exceeding an additional test threshold as a second test failure; and transmit the alert of test failure to at least one of an email of one or more users of the system or GUI of a mobile device of the one or more users of the system. The second test failure is representative of verification of the first test failure.

According to yet another embodiment of the present disclosure, a method for intelligent machine learning model monitoring may include executing one or more statistical tests for one or more metrics to determine whether at least one of data used or an output in each machine learning model of a plurality of machine learning models is statistically similar to expectations based on at least one of training data or test data for each model. When a first test failure of a tested model of the plurality of machine learning models occurs based on the one or more statistical tests for the one or more metrics exceeding a first test threshold, the method may further include automatically executing an additional test based on the first test failure and additional historical data, and automatically generating an alert of test failure for the tested model based on the additional test exceeding an additional test threshold as a second test failure. The second test failure is representative of verification of the first test failure.

Although the concepts of the present disclosure are described herein with primary reference in at least FIGS. 4-7 to systems and methods for one or more monitoring machine learning models in an insurance setting, it is contemplated that the concepts will enjoy applicability to any setting for purposes of machine learning model monitoring and support, including and not limited to, other business or organizational or technical based settings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 6 illustrates a GUI showing a plurality of metrics for a model with one or more bounds, test results values, and comments for alerts, according to one or more embodiments shown and described herein;

DETAILED DESCRIPTION

Figure 1:
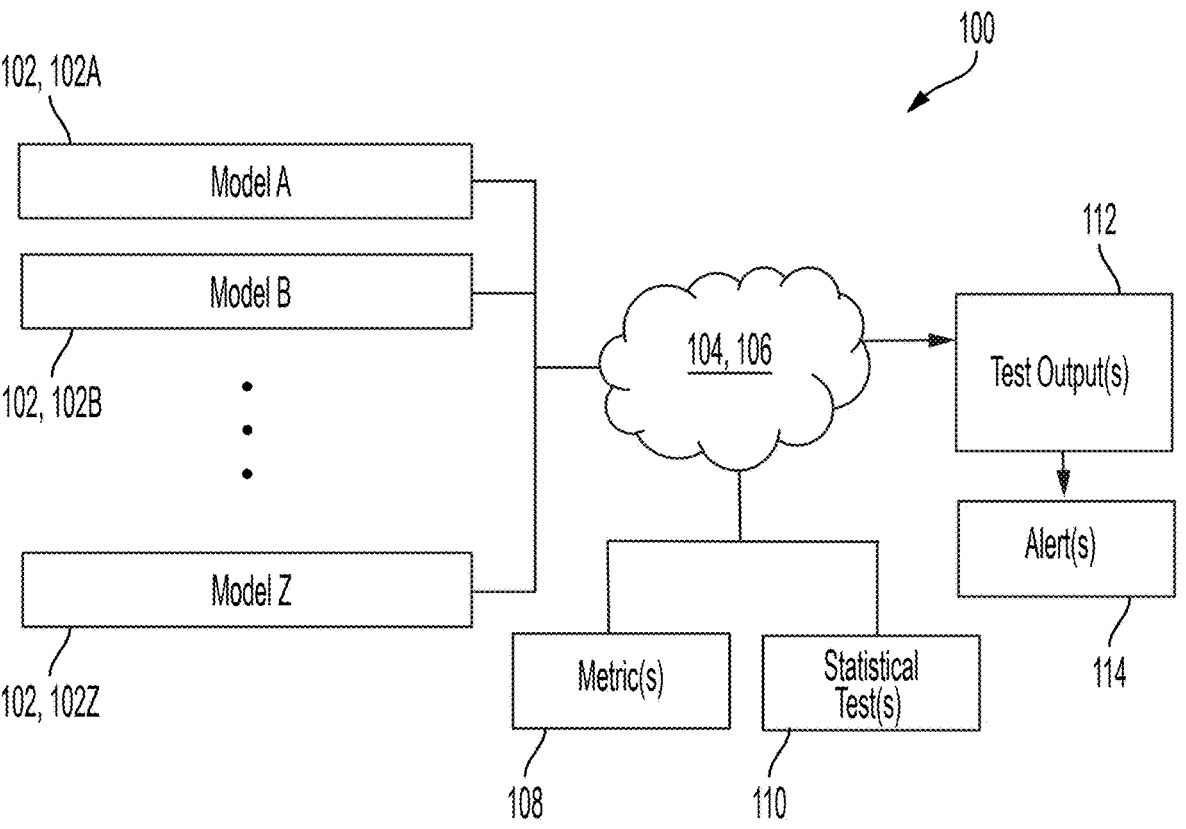
FIG. 1 illustrates an environment for intelligent machine learning model monitoring, according to one or more embodiments shown and described herein.

In embodiments described herein, systems and methods may include an artificial intelligence (AI) based software application that is configured to monitor a plurality of machine learning models by executing statistical tests and generating alerts for (1) monitoring data used in the model (inputs/predictors) to make sure the data is statistically similar to what is expected (based on training data); and (2) monitoring the output (such as scores) of the model to make sure it is statistically similar to what is expected (based on test data). Further, (3) for any test failures, a second test may be automatically run based upon a first test failure and based on additional data such as historical data to determine why the first test may have failed and an additional threshold applied prior to automatically generating an alert of test failure. Such a second test allows for a dual verification of test results after a first test failure result for a metric of a monitored model.

Once machine learning models are used after being produced and trained as a production model, there may be instances where the new, in-use models are not performing as intended. For example, the data of the new models may start to deviate from what is expected based on the training and/or a new model may need to be retrained. The present disclosure is directed to an automated system to monitor such machine learning models by executing statistical tests and generating alerts for (1) monitoring data used in the model (inputs/predictors) to make sure the data is statistically similar to what is expected (based on training data); (2) monitoring the output (such as scores) of the model to make sure it is statistically similar to what is expected (based on test data); and (3) using a recurrent automated process to compare a model to the production model to understand statistical similarities/differences as a concept drift concept quantified as a divergence. For a divergence over an acceptable divergence threshold, an alert may be generated that the new model is no longer acceptable and accurate and a recommendation may be made to retrain the new model. The retrained new model may be able to replace the old model in production as the updated production model. For each model, specific metrics/tests based on model characteristics may be used. Dashboards and alerts may be provided to assess model health and allow action when a model is at risk. Automated summaries of model health and performance may be generated and recommendations may be automatically generated by an intelligent AI monitoring platform, such as within an environment 100 of FIG. 1 as described herein an in greater detail further below.

In embodiments, the AI monitoring platform may be configured to be an automated analyst generating such recommendations based on model health and further may automatically implement one or more recommendations, such as to provide instructions to retrain a model. The AI monitoring platform may further be configured to automatically set and update ranges to determine whether a test on a model fails or passes based on the metrics utilized. The AI monitoring platform may automatically generate an alert based on a test failure. On the dashboard, the AI monitoring platform may be able to provide automated determinations predicting why a test may have failed. Further, the AI monitoring platform may be configured to automatically run a second test based upon a first test failure and based on additional data such as historical data to determine why the first test may have failed and apply additional threshold prior to automatically generating an alert of test failure. For instance, the second test may determine the first test may have failed because it was conducted during a holiday week that historically had lower metrics for those metrics being tested. The second test may compare the data to a similar historical holiday data at a lower threshold and determine that the second test passes such that an alert need not be generated. The environment 100 may include a graphical user interface (GUI) configured to present a report on a monitored status of a plurality of machine learning models 102 being monitored in a centralized location, as will be described in greater detail below.

Referring to FIG. 1, the environment 100 for intelligent machine learning model monitoring includes the plurality of machine learning models 102 such a respective models 102A, 102B, to 102Z, an intelligent monitoring model 104 implementing a monitoring solution 106, one or more metrics 108 for each of the models 102 as inputs, and one or more statistical tests 110. The monitoring solution 106 may be an AI based software algorithm stored as machine readable instructions in a memory component 306 (FIG. 3) communicatively coupled to a processor 304 and configured to implement a control scheme (such as described below in a process 200 of FIG. 2) when executed by the processor 304. The environment 100 may further include one or more test outputs 112 as test results and one or more alerts 114 output by the intelligent monitoring model 104 and as described herein.

Figure 2:
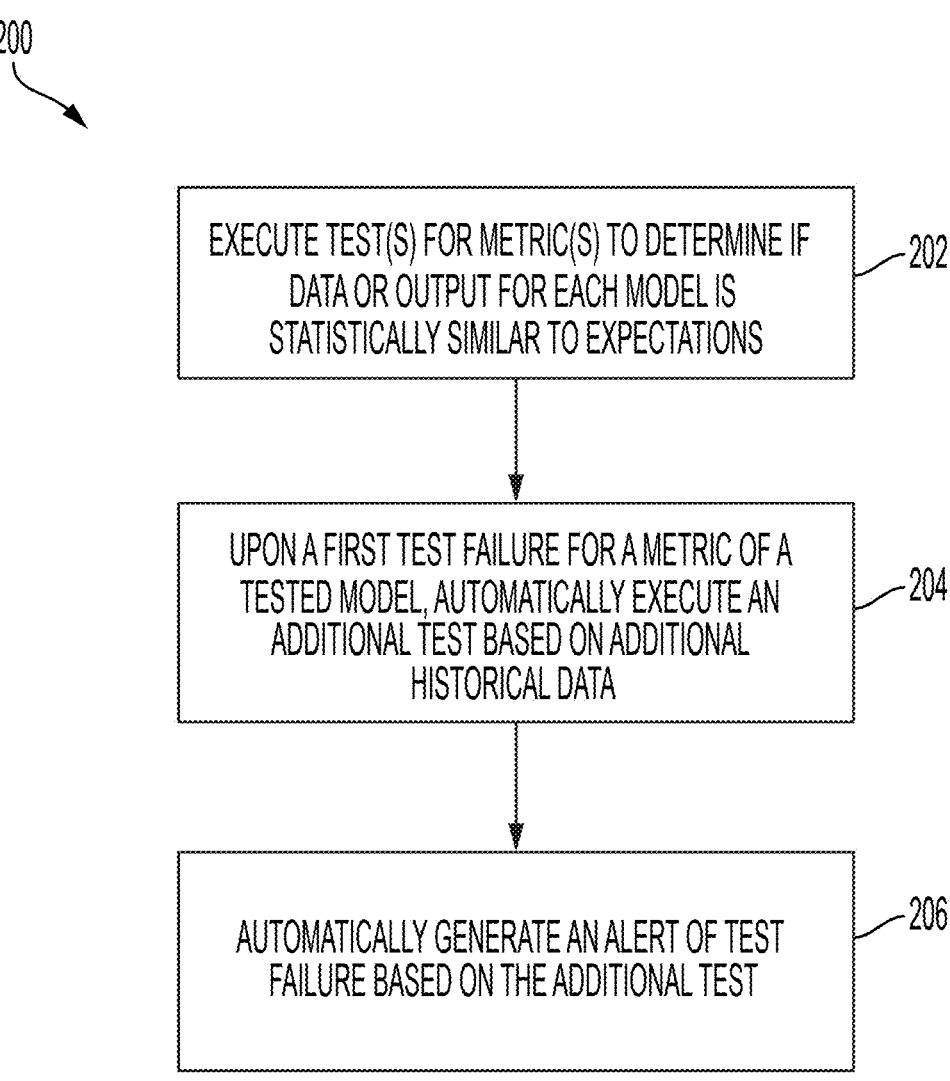
FIG. 2 illustrates a flowchart process for the environment of FIG. 1, according to one or more embodiments shown and described herein.

Referring to FIG. 2, an embodiment of a process 200 is shown for use of the environment 100 of FIG. 1 (as implemented by a system 300 of FIG. 3, described in greater detail below). In block 202, one or more statistical tests 110 for one or more metrics 108 may be executed to determine whether at least one of data used or an output in each machine learning model 102 (i.e., 102A, 102B, to 102Z) of a plurality of machine learning models 102 is statistically similar to expectations based on at least one of training data or test data for each model 102. The one or more statistical tests 110 for the one or more metrics 108 may include an L-Infinity test, a KL divergence test, or a bounds statistical test. The one or more metrics 108 may include for a model 102 at least one of area under curve (AUC) to capture model accuracy, model cost, model precision, a false positive false negative (FPFN) analysis of the model 102, or combinations thereof. A cost metric may be set up in such a way as to trigger notifications when cost is greater than a configured value. In some embodiments, the one or more statistical tests 110 for the one or more metrics 108 may be executed by comparing the one or more metrics 108 of the tested model 102 to the one or more metrics 108 of a production model 102. The tested model 102 is based on the production model 102 as trained to produce the tested model 102. The tested model 102 may thus be a new, in-use model 102 that is based on the production model and that can learn from new, real-time data, while the production model is frozen in time from the training data of its training period. The comparison may indicate that the tested model 102 based on new, real-time data is diverging from the production model by an unacceptable concept drift that exceeds a divergence threshold such that the tested model 102 should be retrained as a new production model to improve accuracy.

In embodiments, to execute the one or more statistical tests 110 for one or more metrics 108, one or more statistical tests 110 for one or more first metrics as the one or more metrics 108 may be executed to determine whether data (e.g., inputs and/or predictions) used in each machine learning model 102 of a plurality of machine learning models 102 is statistically similar to expectations based on training data for each model 102. Further, one or more statistical tests 110 for one or more second metrics as the one or more metrics 108 may be executed to determine whether an output (e.g., scores) of each machine learning model 102 of the plurality of machine learning models 102 is statistically similar to expectations based on test data for each model 102.

In block 204, when a first test failure of a tested model 102 of the plurality of machine learning models 102 occurs based on the one or more statistical tests 110 for the one or more metrics 108 exceeding a first test threshold, an additional test is automatically executed based on the first test failure and additional historical data. In embodiments, when the first test failure of a tested model 102 of the plurality of machine learning models 102 occurs based on the one or more statistical tests 110 for the one or more first metrics (e.g., as the one or more metrics 108) or the one or more statistical tests 110 for the one or more second metrics (e.g., as the one or more metrics 108) exceeding the first test threshold, the additional test may be automatically executed based on the first test failure and additional historical data.

In block 206, an alert 114 of test failure for the tested model is automatically generated based on the additional test exceeding an additional test threshold as a second test failure. The second test failure is representative of verification of the first test failure. The alert 114 of test failure may be displayed at a dashboard GUI, which may be, for example, the centralized location to display the monitored models 102, communicatively coupled to the AI based software application (e.g., of the monitoring solution 106) of the system 300 of FIG. 3, which is described in greater detail below. The AI based software application is configured to execute the one or more statistical tests 110 for the one or more metrics 108. A recommendation may be automatically generated based on the alert 114 of test failure for the tested model 102, and the recommendation may be displayed on the dashboard GUI. In embodiments, the recommendation is to re-train the tested model 102.

Figure 7:
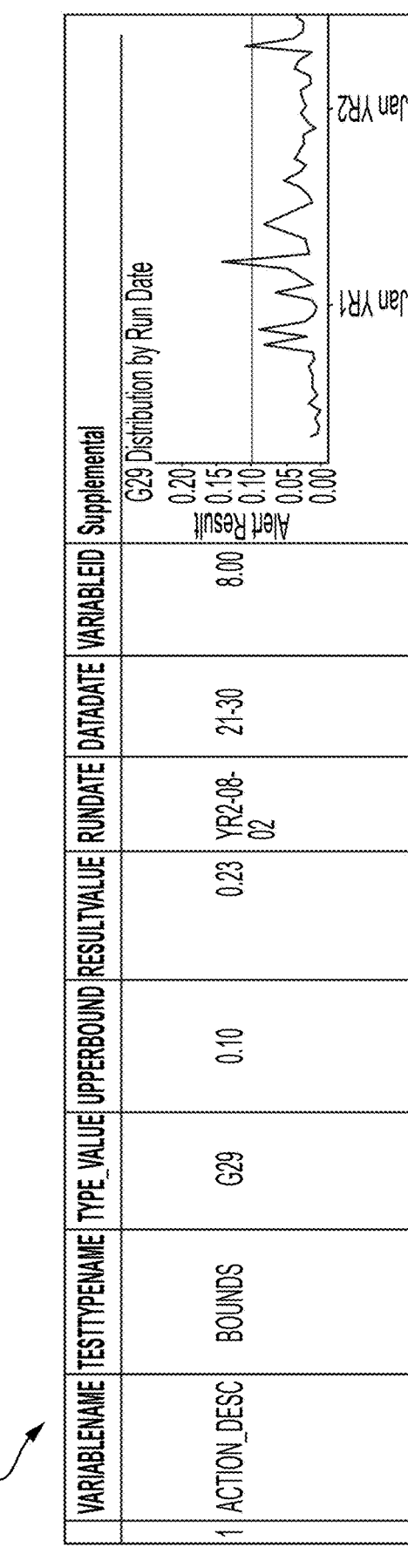
FIG. 7 illustrates a display of an alert of a test failure or a model as a transmittal when a boundary has been exceeded during a test, according to one or more embodiments shown and described herein.

In aspects, the alert 114 of test failure may be transmittal to at least one of an email of one or more users of the system 300 or GUI of a mobile device of the one or more users of the system 300. FIG. 7, described in detail below, shows an example of such a transmitted alert 114.

Figure 3:
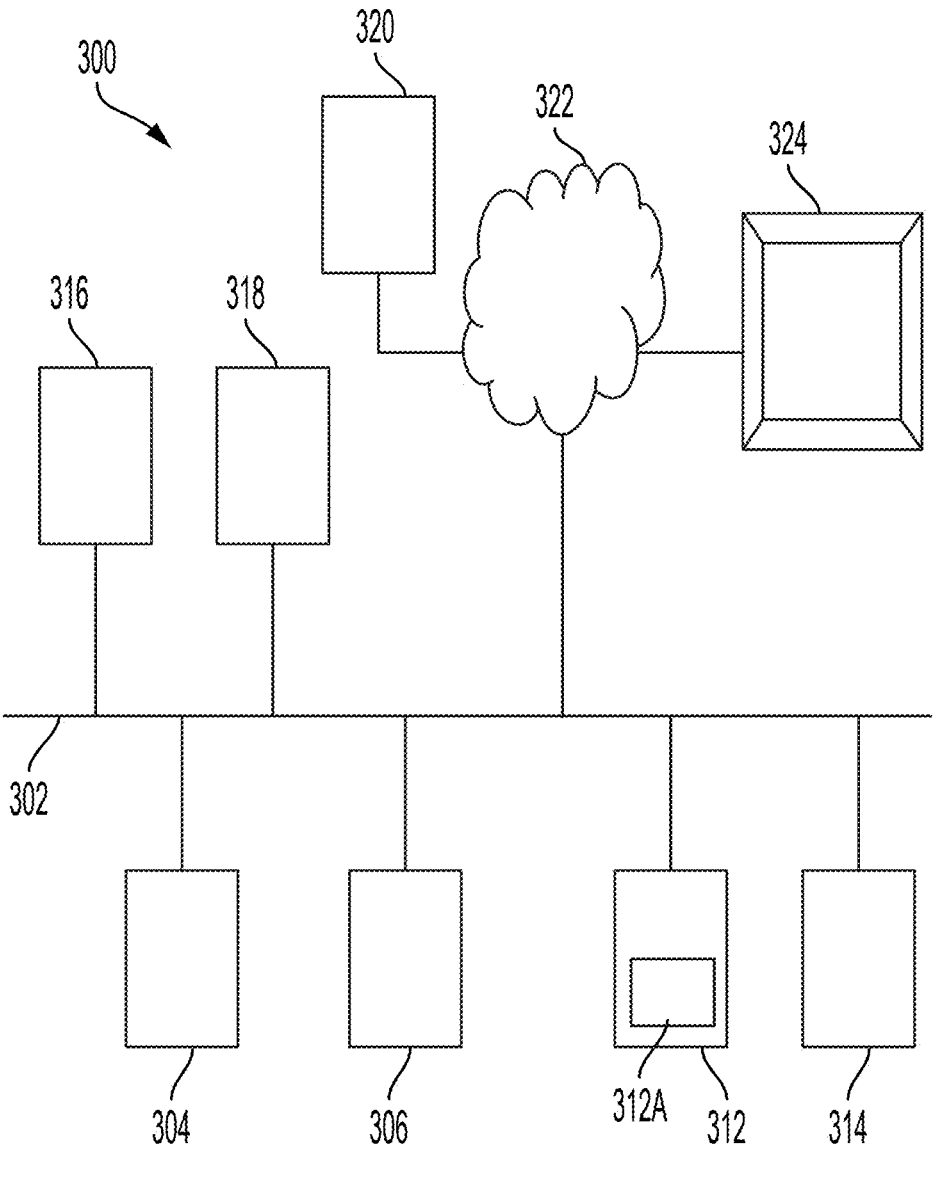
FIG. 3 illustrates a computer implemented system including a system for use with the process flow of FIG. 2 and the environment of FIG. 1, according to one or more embodiments shown and described herein.

FIG. 3 illustrates a computer implemented system 300 for use with the process 200 of FIG. 2. Referring to FIG. 3, a non-transitory, system 300 for implementing a computer and software-based method, such as directed by the environment 100 and the process 200, for intelligent machine learning model monitoring as described herein. The system 300 comprises a communication path 302, one or more processors 304, a non-transitory memory component 306, an alert generation module 312, a testing sub-module 312A of the alert generation module 312, a storage or database 314, a machine learning module 316, a network interface hardware 318, a network 322, a server 320, and a computing device 324. The various components of the system 300 and the interaction thereof will be described in detail below.

While only one server 320 and one computing device 324 are illustrated, the system 300 can comprise multiple servers containing one or more applications and computing devices. In some embodiments, the system 300 is implemented using a wide area network (WAN) or network 322, such as an intranet or the internet. The computing device 324 may include digital systems and other devices permitting connection to and navigation of the network. It is contemplated and within the scope of this disclosure that the computing device 324 may be a personal computer, a laptop device, a smart mobile device such as a smart phone or smart pad, or the like. Other system 300 variations allowing for communication between various geographically diverse components are possible. The lines depicted in FIG. 3 indicate communication rather than physical connections between the various components.

The system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

The system 300 of FIG. 3 also comprises the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated system 300 further comprises the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor 304, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, as noted above, the system 300 comprises the display such as the GUI on a screen of the computing device 324 for providing visual output such as, for example, information, graphical reports, messages, or a combination thereof. The display on the screen of the computing device 324 is coupled to the communication path 302 and communicatively coupled to the processor 304. Accordingly, the communication path 302 communicatively couples the display to other modules of the system 300. The display can comprise any medium capable of transmitting an optical output such as, for example, a cathode ray tube, light emitting diodes, a liquid crystal display, a plasma display, or the like. Additionally, it is noted that the display or the computing device 324 can comprise at least one of the processor 304 and the memory component 306. While the system 300 is illustrated as a single, integrated system in FIG. 3, in other embodiments, the systems can be independent systems.

The system 300 comprises the alert generation module 312 as described above to automatically generate an alert of test failure for the tested model, the testing sub-module 312A to implement said model testing as described herein, and the machine learning module 316 for learning of said testing sub-module 312A and/or alert generation module 312. The machine learning module 316 may include an artificial intelligence component to train and provide machine learning capabilities to a neural network as described herein.

The alert generation module 312, the testing sub-module 312A, and the machine learning module 316 are coupled to the communication path 302 and communicatively coupled to the processor 304. As will be described in further detail below, the processor 304 may process the input signals received from the system modules and/or extract information from such signals.

Data stored and manipulated in the system 300 as described herein is utilized by the machine learning module 316, which is able to leverage a cloud computing-based network configuration such as the cloud to apply Machine Learning and Artificial Intelligence. This machine learning application may create models that can be applied by the system 300, to make it more efficient and intelligent in execution. As an example and not a limitation, the machine learning module 316 may include artificial intelligence components selected from the group consisting of an artificial intelligence engine, Bayesian inference engine, and a decision-making engine, and may have an adaptive learning engine further comprising a deep neural network learning engine.

The system 300 comprises the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can comprise a communication transceiver for sending and/or receiving data according to any wireless communication standard. For example, the network interface hardware 318 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 3, data from various applications running on computing device 324 can be provided from the computing device 324 to the system 300 via the network interface hardware 318. The computing device 324 can be any device having hardware (e.g., chipsets, processors, memory, etc.) for communicatively coupling with the network interface hardware 318 and a network 322. Specifically, the computing device 324 can comprise an input device having an antenna for communicating over one or more of the wireless computer networks described above.

The network 322 can comprise any wired and/or wireless network such as, for example, wide area networks, metropolitan area networks, the internet, an intranet, satellite networks, or the like. Accordingly, the network 322 can be utilized as a wireless access point by the computing device 324 to access one or more servers (e.g., a server 320). The server 320 and any additional servers generally comprise processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

Figure 4:
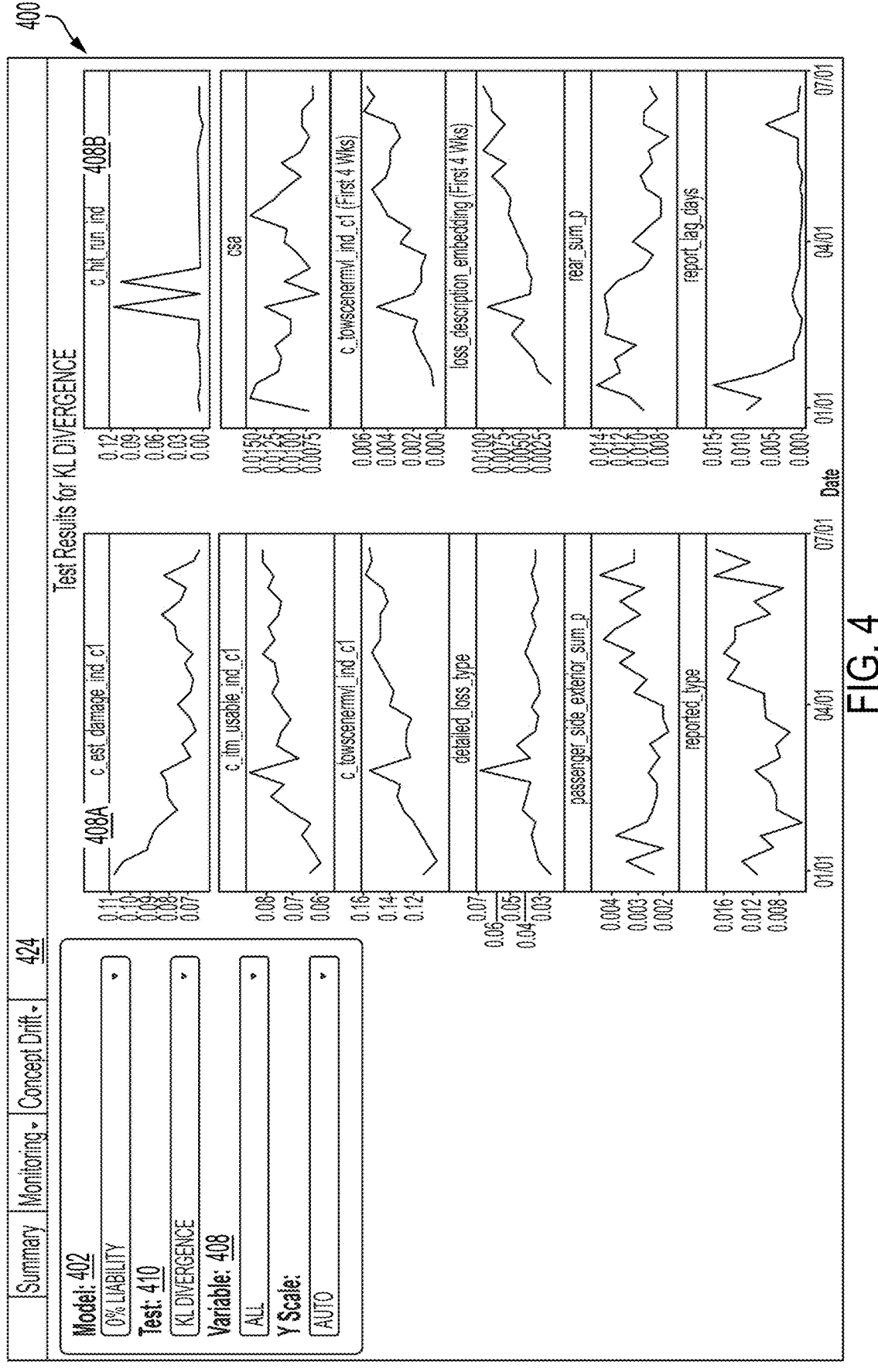
FIG. 4 illustrates a graphical user interface (GUI) showing test results on a model based on a type of statistical test across various metrics over a period of time, according to one or more embodiments shown and described herein.

Referring to FIG. 4, a GUI 400 illustrates test results 424 on a model 102, 402 based on a type of statistical test 110, 410 across various metrics 108, 408 over a period of time. The model 402 of FIG. 4 is a 0% Liability machine learning model as may be used to determine liability factors and metrics for an insurance company to determine how to process claims. The metrics 408A, 408B, 408 for the model 402 shown in FIG. 4 include, for example, but are not limited to metrics indicative of estimated damage or a hit and run determination.

Figure 5:
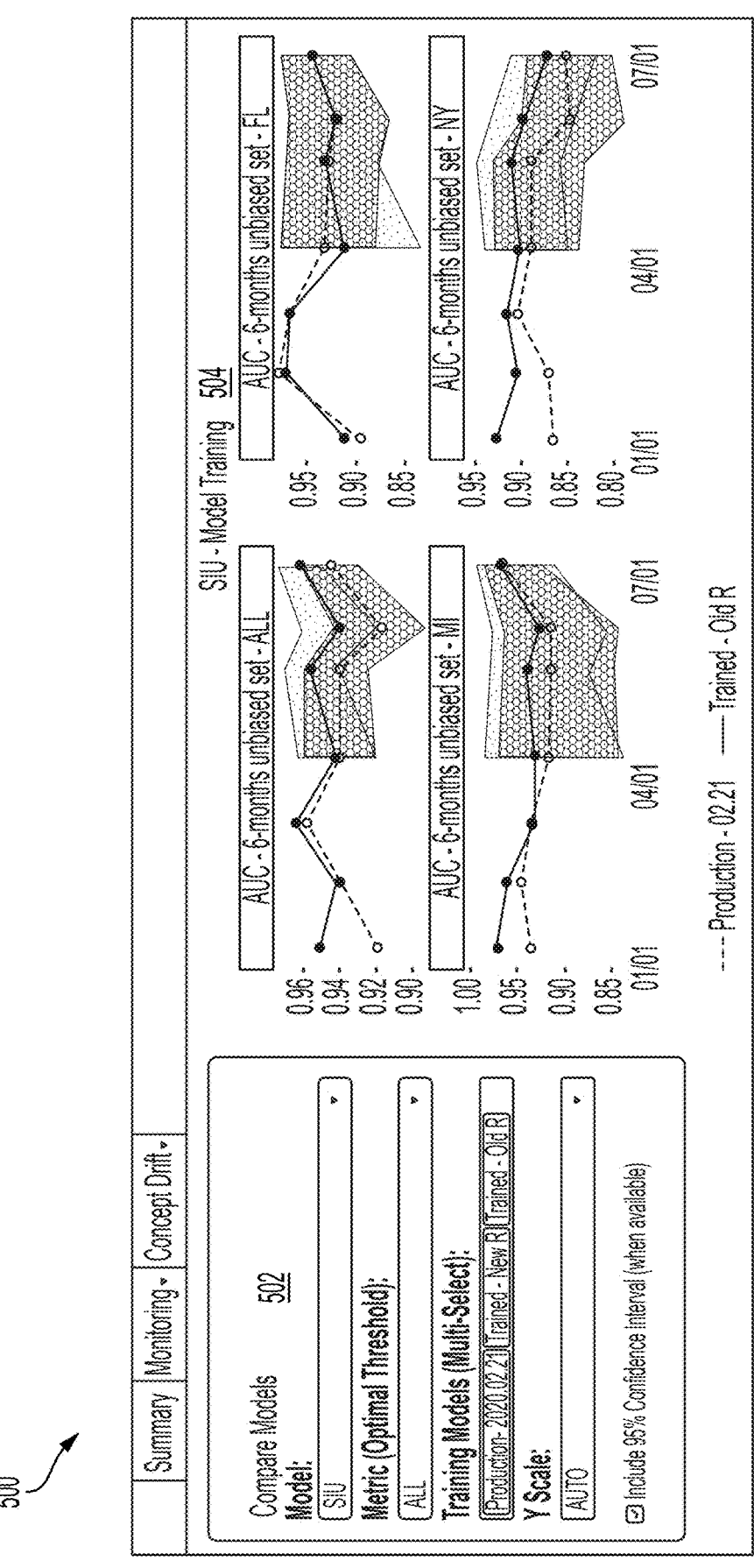
FIG. 5 illustrates a GUI showing test results of a tested model compared to a production model over a period of time, according to one or more embodiments shown and described herein.

Referring to FIG. 5, a GUI 500 illustrates test results 504 of a tested model compared in a comparison 502 to a production model over a period of time. The model is for a special investigative unit (SIU) model to detect and pursue actions against fraudulent activities. The test results 504 are shown in graphical depictions across all metrics and then those drilled down for the states of Michigan, Florida, and Indiana. While the test results 504 show a slight concept drift as a quantified divergence between the new model and the production model across all metrics, the metrics for Florida and Michigan show very little concept drift while the metrics for New York show more of a concept drift over time. When the concept drift indicative of a quantified divergence of a tested model against a production model is above a certain threshold, the system 300 may be configured to recommend retraining of the tested model to set as a new production model.

Referring to FIG. 6, a GUI 600 illustrates comments for failed tests report 602 depicting a plurality of metrics for a model 102 (shown as the 0% Liability model example) with one or more bounds, test results values, and comments for alerts. As a non-limiting embodiments, a lower bound of 5500 is shown for the variable or metric scored_count, and an initial lower bound of 0.6 is shown for the variable or metric slicedetaillosstype_auc. For 11/25 for the metric scored_count, for a bounds statistical test, the test result value of 5945 is shown with respect and near to the lower bound of 5500 within a threshold triggering an alert. A comment for an alert as a potential explanation is shown as a reason potentially being that a smaller weekly data scored might be due to a Thanksgiving holiday such that the threshold might need to be adjusted to be lowered. For ⅙ for the metric scored_count, the test result value of 4813 is shown with respect to the lower bound of 5500. A comment for an alert as a potential explanation is shown as a reason potentially being that a lower value was due to a New Year's holiday. For 10/07 for the metric slicedetaillosstype_auc, the test result value of 0.677625 exceeded the lower bound of 0.6. A comment for an alert to modify threshold resulted in a modification to 0.9, which was later modified to 0.65 as shown in the comments for failed tests report 602 of the GUI 600. Filters with respect to the metric, here a loss type, may be applied as shown, such as for loss type a filter of head-on collision, rear-end accident of multiple cars, or making a turn.

Referring to FIG. 7, a display 700 is shown of an alert of a test failure or a model 102 as a transmittal when a boundary has been exceeded during a test. A graphical depiction is shown with the threshold line (the upper bound set at 0.10) and the points over a period of time when the upper bound has been exceeded.

In embodiments, when a model 102 is added to the environment 100, alerts 114 or tests may be manually or automatically created. An AI process could automatically extract the most important predictors of the model 102 to automatically determine the tests to be created. Each test includes a threshold, which is may be manually or automatically determined. The AI process could be leveraged to automatically learn the past data and then recommend and/or implement one or more thresholds for a test. For concept drift as described herein, the AI process can automatically recommend certain metrics and trigger a notification only when certain conditions apply, that the AI process has learned predict concept drift. If concept drift is detected, a new model may be automatically trained and deployed into production as the updated production model. In aspects, the AI process may be used to automatically send alert emails when certain patterns are detected indicating an issue to eliminate false alerts otherwise related to seasonal fluctuation and/or random outliers.

Further, a summary based on test results may be manually or automatically configured based upon the audience and metrics captured for a model. The summary could be configured leveraging the AI process. The AI process can aid to summarize similar metrics and automatically prepare and transmit an email to a specific audience at regular intervals and/or when an issue is detected. Also, the AI process may automatically derive and report upon a conclusion of the state of a model from the tests included with respect to the summary. Such intelligent systems and methods as described herein aid to improve accuracy of the models and increase model updates in a timely fashion to save time, cost, and computing processes and efficiencies over time.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing

Aspect 1. A system for intelligent machine learning model monitoring includes one or more processors, one or more memory components communicatively coupled to the one or more processors, and machine readable instructions stored in the one or more memory components that cause the system to perform at least the following when executed by the one or more processors: execute one or more statistical tests for one or more metrics to determine whether at least one of data used or an output in each machine learning model of a plurality of machine learning models is statistically similar to expectations based on at least one of training data or test data for each model. The machine readable instructions further cause the system to: when a first test failure of a tested model of the plurality of machine learning models occurs based on the one or more statistical tests for the one or more metrics exceeding a first test threshold, automatically execute an additional test based on the first test failure and additional historical data; and automatically generate an alert of test failure for the tested model based on the additional test exceeding an additional test threshold as a second test failure. The second test failure is representative of verification of the first test failure.

Aspect 2. The system of Aspect 1, further including machine readable instructions that cause the system to perform at least the following when executed by the one or more processors: to execute the one or more statistical tests for one or more metrics, execute one or more statistical tests for one or more first metrics to determine whether data used in each machine learning model of the plurality of machine learning models is statistically similar to expectations based on training data for each model, and execute one or more statistical tests for one or more second metrics to determine whether an output of each machine learning model of the plurality of machine learning models is statistically similar to expectations based on test data for each model. The machine readable instructions further cause the system to, when the first test failure of the tested model of the plurality of machine learning models occurs based on the one or more statistical tests for the one or more first metrics or the one or more statistical tests for the one or more second metrics exceeding the first test threshold, automatically execute the additional test based on the first test failure and additional historical data.

Aspect 3. The system of Aspect 1 or Aspect 2, further including machine readable instructions that cause the system to perform at least the following when executed by the one or more processors: display the alert of test failure at a dashboard graphical user interface (GUI) communicatively coupled to an artificial intelligence (AI) based software application of the system, the AI based software application configured to execute the one or more statistical tests for the one or more metrics.

Aspect 4. The system of any of Aspect 1 to Aspect 3, further including machine readable instructions that cause the system to perform at least the following when executed by the one or more processors: automatically generate a recommendation based on the alert of test failure for the tested model; and display the recommendation on the dashboard GUI.

Aspect 5. The system of Aspect 4, wherein the recommendation is to re-train the tested model.

Aspect 6. The system of any of Aspect 1 to Aspect 5, further including machine readable instructions that cause the system to perform at least the following when executed by the one or more processors: transmit the alert of test failure to at least one of an email of one or more users of the system or GUI of a mobile device of the one or more users of the system.

Aspect 7. The system of any of Aspect 1 to Aspect 6, wherein the one or more statistical tests for the one or more metrics comprise an L-Infinity test, a KL divergence test, or a bounds statistical test.

Aspect 8. The system of any of Aspect 1 to Aspect 7, wherein the one or more metrics comprise at least one of area under curve (AUC) to capture model accuracy, model cost, model precision, a false positive false negative (FPFN) analysis of the model, or combinations thereof.

Aspect 9. The system of any of Aspect 1 to Aspect 8, further including machine readable instructions that cause the system to perform at least the following when executed by the one or more processors: execute the one or more statistical tests for the one or more metrics by comparing the one or more metrics of the tested model to the one or more metrics of a production model, wherein the tested model is based on the production model as trained to produce the tested model.

Aspect 10. A system for intelligent machine learning model monitoring includes one or more processors, one or more memory components communicatively coupled to the one or more processors, and machine readable instructions stored in the one or more memory components. The machine readable instructions cause the system to perform at least the following when executed by the one or more processors: execute one or more statistical tests for one or more first metrics to determine whether data used in each machine learning model of a plurality of machine learning models is statistically similar to expectations based on training data for each model; and execute one or more statistical tests for one or more second metrics to determine whether an output of each machine learning model of the plurality of machine learning models is statistically similar to expectations based on test data for each model. When a first test failure of a tested model of the plurality of machine learning models occurs based on the one or more statistical tests for the one or more first metrics or the one or more statistical tests for the one or more second metrics exceeding a first test threshold, the machine readable instructions further cause the system to automatically execute an additional test based on the first test failure and additional historical data. The machine readable instructions further cause the system to: automatically generate an alert of test failure for the tested model based on the additional test exceeding an additional test threshold as a second test failure; and transmit the alert of test failure to at least one of an email of one or more users of the system or GUI of a mobile device of the one or more users of the system. The second test failure is representative of verification of the first test failure.

Aspect 11. The system of Aspect 10, further including machine readable instructions that cause the system to perform at least the following when executed by the one or more processors: display the alert of test failure at a dashboard graphical user interface (GUI) communicatively coupled to an artificial intelligence (AI) based software application of the system, the AI based software application configured to execute the one or more statistical tests for the one or more first metrics and the one or more statistical tests for the one or more second metrics.

Aspect 12. The system of Aspect 11, further including machine readable instructions that cause the system to perform at least the following when executed by the one or more processors: automatically generate a recommendation based on the alert of test failure for the tested model; and display the recommendation on the dashboard GUI.

Aspect 13. The system of Aspect 12, wherein the recommendation is to re-train the tested model.

Aspect 14. The system of any of Aspect 10 to Aspect 13, wherein the one or more statistical tests for the one or more first metrics or the one or more statistical tests for the one or more second metrics comprise an L-Infinity test, a KL divergence test, or a bounds statistical test.

Aspect 15. The system of any of Aspect 10 to Aspect 14, wherein the one or more first metrics or the one or more second metrics comprise at least one of area under curve (AUC) to capture model accuracy, model cost, model precision, a false positive false negative (FPFN) analysis of the model, or combinations thereof.

Aspect 16. The system of any of Aspect 10 to Aspect 15, further including machine readable instructions that cause the system to perform at least the following when executed by the one or more processors: execute the one or more statistical tests for the one or more first metrics by comparing the one or more first metrics of the tested model to the one or more first metrics of a production model, wherein the tested model is based on the production model as trained to produce the tested model; and execute the one or more statistical tests for the one or more second metrics by comparing the one or more second metrics of the tested model to the one or more second metrics of the production model.

Aspect 17. A method for intelligent machine learning model monitoring includes executing one or more statistical tests for one or more metrics to determine whether at least one of data used or an output in each machine learning model of a plurality of machine learning models is statistically similar to expectations based on at least one of training data or test data for each model. When a first test failure of a tested model of the plurality of machine learning models occurs based on the one or more statistical tests for the one or more metrics exceeding a first test threshold, the method further includes automatically executing an additional test based on the first test failure and additional historical data, and automatically generating an alert of test failure for the tested model based on the additional test exceeding an additional test threshold as a second test failure. The second test failure is representative of verification of the first test failure.

Aspect 18. The method of Aspect 17, further including, to execute the one or more statistical tests for one or more metrics: executing one or more statistical tests for one or more first metrics to determine whether data used in each machine learning model of the plurality of machine learning models is statistically similar to expectations based on training data for each model, and executing one or more statistical tests for one or more second metrics to determine whether an output of each machine learning model of the plurality of machine learning models is statistically similar to expectations based on test data for each model. When the first test failure of the tested model of the plurality of machine learning models occurs based on the one or more statistical tests for the one or more first metrics or the one or more statistical tests for the one or more second metrics exceeding the first test threshold, further including automatically executing the additional test based on the first test failure and additional historical data.

Aspect 19. The method of Aspect 17 or Aspect 18, further including displaying the alert of test failure at a dashboard graphical user interface (GUI) communicatively coupled to an artificial intelligence (AI) based software application of the system, the AI based software application configured to execute the one or more statistical tests for the one or more metrics.

Aspect 20. The method of Aspect 19, further including automatically generating a recommendation based on the alert of test failure for the tested model, and displaying the recommendation on the dashboard GUI.

What is claimed is:

1. A system for intelligent machine learning model monitoring, the system comprising:

one or more processors;

one or more memory components communicatively coupled to the one or more processors; and machine-readable instructions stored in the one or more memory components that cause the system to perform at least the following when executed by the one or more processors:

execute, during runtime of a deployed machine learning model, one or more statistical tests for one or more monitored metrics, the one or more statistical test comparing whether at least one of data used or an output in each machine learning model of a plurality of machine learning models is statistically similar to expectations based on at least one of training data or test data for each model;

when a first test failure of a tested model of the plurality of machine learning models occurs based on the one or more statistical tests for the one or more metrics exceeding a first test threshold, automatically execute, in response to the first test failure and without re-executing the first test, an additional test based on the first test failure and additional historical data; and automatically generate an alert for the machine learning model only when the additional test for the tested model exceeds an additional test threshold as a second test failure, wherein the second test failure is representative of verification of the first test failure.

2. The system of claim 1, further comprising machine readable instructions that cause the system to perform at least the following when executed by the one or more processors:

to execute the one or more statistical tests for one or more metrics, execute one or more statistical tests for one or more first metrics to determine whether data used in each machine learning model of the plurality of machine learning models is statistically similar to expectations based on training data for each model, and execute one or more statistical tests for one or more second metrics to determine whether an output of each machine learning model of the plurality of machine learning models is statistically similar to expectations based on test data for each model; and when the first test failure of the tested model of the plurality of machine learning models occurs based on the one or more statistical tests for the one or more first metrics or the one or more statistical tests for the one or more second metrics exceeding the first test threshold, automatically execute the additional test based on the first test failure and additional historical data.

3. The system of claim 1, further comprising machine readable instructions that cause the system to perform at least the following when executed by the one or more processors:

display the alert of test failure at a dashboard graphical user interface (GUI) communicatively coupled to an artificial intelligence (AI) based software application of the system, the AI based software application configured to execute the one or more statistical tests for the one or more metrics.

4. The system of claim 3, further comprising machine readable instructions that cause the system to perform at least the following when executed by the one or more processors:

automatically generate a recommendation based on the alert of test failure for the tested model; and display the recommendation on the dashboard GUI.

5. The system of claim 4, wherein the recommendation is to re-train the tested model.

6. The system of claim 1, further comprising machine readable instructions that cause the system to perform at least the following when executed by the one or more processors:

transmit the alert of test failure to at least one of an email of one or more users of the system or GUI of a mobile device of the one or more users of the system.

7. The system of claim 1, wherein the one or more statistical tests for the one or more metrics comprise an L-Infinity test, a KL divergence test, or a bounds statistical test.

8. The system of claim 1, wherein the one or more metrics comprise at least one of area under curve (AUC) to capture model accuracy, model cost, model precision, a false positive false negative (FPFN) analysis of the model, or combinations thereof.

9. The system of claim 1, further comprising machine readable instructions that cause the system to perform at least the following when executed by the one or more processors:

execute the one or more statistical tests for the one or more metrics by comparing the one or more metrics of the tested model to the one or more metrics of a production model, wherein the tested model is based on the production model as trained to produce the tested model.

10. A system for intelligent machine learning model monitoring, the system comprising: one or more processors; one or more memory components communicatively coupled to the one or more processors; and machine readable instructions stored in the one or more memory components that cause the system to perform at least the following when executed by the one or more processors:

execute, during runtime of a deployed machine learning model, one or more statistical tests for one or more first metrics, the one or more statistical test comparing whether data used in each machine learning model of a plurality of machine learning models is statistically similar to expectations based on training data for each model;

execute one or more statistical tests for one or more second metrics to determine whether an output of each machine learning model of the plurality of machine learning models is statistically similar to expectations based on test data for each model;

when a first test failure of a tested model of the plurality of machine learning models occurs based on the one or more statistical tests for the one or more first metrics or the one or more statistical tests for the one or more second metrics exceeding a first test threshold, automatically execute, in response to the first test failure and without re-executing the first test, an additional test based on the first test failure and additional historical data;

automatically generate an alert for the machine learning model only when the additional test for the tested model exceeds an additional test threshold as a second test failure, wherein the second test failure is representative of verification of the first test failure; and transmit the alert of test failure to at least one of an email of one or more users of the system or GUI of a mobile device of the one or more users of the system.

11. The system of claim 10, further comprising machine readable instructions that cause the system to perform at least the following when executed by the one or more processors:

display the alert of test failure at a dashboard graphical user interface (GUI) communicatively coupled to an artificial intelligence (AI) based software application of the system, the AI based software application configured to execute the one or more statistical tests for the one or more first metrics and the one or more statistical tests for the one or more second metrics.

12. The system of claim 11, further comprising machine readable instructions that cause the system to perform at least the following when executed by the one or more processors:

automatically generate a recommendation based on the alert of test failure for the tested model; and display the recommendation on the dashboard GUI.

13. The system of claim 12, wherein the recommendation is to re-train the tested model.

14. The system of claim 10, wherein the one or more statistical tests for the one or more first metrics or the one or more statistical tests for the one or more second metrics comprise an L-Infinity test, a KL divergence test, or a bounds statistical test.

15. The system of claim 10, wherein the one or more first metrics or the one or more second metrics comprise at least one of area under curve (AUC) to capture model accuracy, model cost, model precision, a false positive false negative (FPFN) analysis of the model, or combinations thereof.

16. The system of claim 10, further comprising machine readable instructions that cause the system to perform at least the following when executed by the one or more processors:

execute the one or more statistical tests for the one or more first metrics by comparing the one or more first metrics of the tested model to the one or more first metrics of a production model, wherein the tested model is based on the production model as trained to produce the tested model; and execute the one or more statistical tests for the one or more second metrics by comparing the one or more second metrics of the tested model to the one or more second metrics of the production model.

17. A method for intelligent machine learning model monitoring, the method comprising:

executing, during runtime of a deployed machine learning model, one or more statistical tests for one or more metrics, the one or more statistical test comparing whether at least one of data used or an output in each machine learning model of a plurality of machine learning models is statistically similar to expectations based on at least one of training data or test data for each model;

when a first test failure of a tested model of the plurality of machine learning models occurs based on the one or more statistical tests for the one or more metrics exceeding a first test threshold, automatically executing, in response to the first test failure and without re-executing the first test, an additional test based on the first test failure and additional historical data; and automatically generating an alert for the machine learning model only when the additional test for the tested model exceeds an additional test threshold as a second test failure, wherein the second test failure is representative of verification of the first test failure.

18. The method of claim 17, further comprising:

to execute the one or more statistical tests for one or more metrics, executing one or more statistical tests for one or more first metrics to determine whether data used in each machine learning model of the plurality of machine learning models is statistically similar to expectations based on training data for each model, and executing one or more statistical tests for one or more second metrics to determine whether an output of each machine learning model of the plurality of machine learning models is statistically similar to expectations based on test data for each model; and when the first test failure of the tested model of the plurality of machine learning models occurs based on the one or more statistical tests for the one or more first metrics or the one or more statistical tests for the one or more second metrics exceeding the first test threshold, automatically executing the additional test based on the first test failure and additional historical data.

19. The method of claim 17, further comprising:

displaying the alert of test failure at a dashboard graphical user interface (GUI) communicatively coupled to an artificial intelligence (AI) based software application of the system, the AI based software application config- ured to execute the one or more statistical tests for the one or more metrics.

20. The method of claim 19, further comprising:

automatically generating a recommendation based on the alert of test failure for the tested model; and displaying the recommendation on the dashboard GUI.

\* \* \* \* \*